United States Patent [19]

Katz et al.

[11] Patent Number: 4,624,184

[45] Date of Patent: Nov. 25, 1986

[54] ANNULAR EXPANSIBLE HEADS FOR A PRINTING CYLINDER ASSEMBLY

[76] Inventors: Sidney Katz; Robert Katz, both of 78 W. 11th St., Apt. 22, New York, N.Y. 10011

[21] Appl. No.: 593,952

[22] Filed: Mar. 27, 1984

[51] Int. Cl.[4] .......... B41F 13/10; B21B 31/32; B23B 31/40

[52] U.S. Cl. .......... 101/375; 29/113 R; 29/117; 269/48.1; 279/2 A

[58] Field of Search .......... 101/375, 376; 29/113 R, 29/117, 125, 129; 51/372, 373; 82/44; 118/DIG. 15; 242/72 B; 269/48.1; 279/1 A, 2 A

[56] References Cited

U.S. PATENT DOCUMENTS

| | | | |
|---|---|---|---|
| 3,253,323 | 5/1966 | Saueressiy | 101/376 |
| 3,378,902 | 4/1968 | Hoexter | 101/375 |
| 3,488,830 | 1/1970 | Miller | 269/48.1 |
| 4,111,569 | 9/1978 | Mengel | 29/113 R |
| 4,381,709 | 5/1983 | Katz | 101/375 |
| 4,386,566 | 6/1983 | Moss | 101/375 |

*Primary Examiner*—Edgar S. Burr
*Assistant Examiner*—David A. Wiecking
*Attorney, Agent, or Firm*—Abelman Frayne Rezac & Schwab

[57] ABSTRACT

A printing cylinder is supported and located by dual annular hydraulically-expansible heads carried by a shaft and adjustable axially thereof and which are inserted into the printing cylinder and then expanded inwardly into locking engagement with the shaft and outwardly into locking engagement with the cylinder.

8 Claims, 3 Drawing Figures

ANNULAR EXPANSIBLE HEADS FOR A PRINTING CYLINDER ASSEMBLY

FIELD OF INVENTION

This invention relates to a printing cylinder assembly of the type used in rotary printing presses, and in particular relates to such a printing cylinder assembly in which the printing cylinder is supported by a mandrel and is removable therefrom in order to permit its substitution by another such printing cylinder.

BACKGROUND OF THE INVENTION

Printing cylinders as used in the printing industry typically are of relatively massive construction, and must be supported in a manner providing maximum stability and concentricity of the printing cylinder during a printing production run. It is not unusual for such cylinders to have a length of 90" or more, and for them to be of relatively large diameter, diameters of 30" or more being practical, and diameters of 12–15" being in common usage. Such cylinders commonly are formed from cold rolled steel or aluminum of a thickness of 0.375 to 0.5 inches, and thus are of considerable weight, this requiring that the cylinders be securely locked to a supporting mandrel and be held in concentricity therewith during driving of the cylinder by the mandrel.

Such cylinders usually are installed on their supporting mandrel by heating the cylinder and then shrink-fitting in onto the mandrel in the manner taught in U.S. Pat. No. 2,787,956, Kirby, et al. Such an operation is a tedious and costly one to perform and also carries with it the disadvantage that the cylinder must be reheated in order to permit its removal from the mandrel and the substitution of a replacement cylinder therefor, and that the replacement cylinder also must be heated to permit its shrink-fitting onto the mandrel.

Attempts have been made to eliminate this disadvantage by providing the mandrel with pneumatically inflatable members which are expanded into supporting and driving engagement with the inner periphery of the cylinder in the manner taught in U.S. Pat. No. 3,253,323, Saueressig. Such pneumatically inflatable members, are, however, unpredictable in their operation, and can result in the cylinder being supported or moving out of concentricity with the mandrel, with consequential bouncing or oscillation of the printing cylinder when under high speed operation. Also, loss of pneumatic pressure can result in the cylinder being released during a printing run, with consequential damage to the cylinder and the rotary printing press, and, considerable hazard to persons in the vicinity of the printing press. Such printing cylinders have considerable mass and thus are capable of storing very considerable kinetic energy when rotated at high angular velocities, such as occurs during operation of the printing press.

Hydraulically expansible heads have been proposed for locating printing cylinders on a mandrel. An example of such a hydraulically expansible head is disclosed in U.S. Pat. No. 4,381,709, Katz. This prior proposal eliminates the problem of heat-shrinking the cylinder onto the mandrel, and also eliminates the problems of bouncing and lack of concentricity of the printing cylinder inherent in pneumatically actuated mandrels, and also problems arising from a loss of pneumatic pressure. In this construction, a pair of journals are ridgedly interconnected by a central sleeve that has been pinned to the respective journals, the respective journals having thin-walled cylindrical expansion diaphragms that are expanded radially outwardly into engagement with the interior of the printing cylinder by hydraulic pumps contained within the journals.

While this prior proposed construction is admirable for its intended purpose, it cannot accommodate an immediate need for the support of a cylinder of different length or diameter than the previous one.

THE INVENTIVE CONCEPT

The present invention has for its object to enhance the utility of the prior proposed mandrel assembly incorporating hydraulically expansible journals to one which is adaptable to a wide range of cylinders of different lengths and different diameters, and which readily can be adapted at the point of use to an existing requirement for the support of a printing cylinder having a different length or diameter to the one previously used.

According to the present invention, a support for a printing cylinder includes annular heads which are adjustably received on a central support shaft common to both of the annular heads. The respective annular heads are movable axially of the associated support shaft and are hydraulically lockable thereto, thus permitting axial adjustment of the heads to accommodate cylinders of different lengths, and permitting an annular head of one outside diameter to be readily exchanged for a similar annular head of a different outside diameter to accommodate cylinders of different diameters.

In this manner, for any given inside diameter of printing cylinder, any length of such cylinders can be accommodated within the length of the central support shaft by a simple adjustment of the annular heads longitudinally of the shaft, and, for any given length of printing cylinder, any internal diameter of such cylinders can be accommodated by the substitution of annular heads of an appropriate outside diameter.

Further, by forming the annular heads for them to be hydraulically lockable onto a central support shaft common to both of the annular heads, problems of the respective heads moving out of true axial alignment and concentricity are eliminated, as is the possibility of the printing cylinder moving out of axial alignment and concentricity with the shaft. Due to the presence of the central support shaft, the respective annular heads are rigidly supported for them to be perpendicular to the axis of rotation of the shaft, and, the printing cylinder itself provides a structural element cooperating with the annular heads and support shaft in the assembled condition of the printing cylinder assembly to provide a concentric box beam arrangement of the printing cylinder assembly, in which deflection forces acting on the shaft are opposed by compressive or tensional forces set up within the printing cylinder, the printing cylinder itself being inherently resistive to deformation under such compressive or tensional forces.

According to the invention, the respective annular heads are each provided with hydraulically actuable expansible members arranged respectively at the inner and outer periphery of the associated head, the heads being slidable longitudinally of the central support shaft and then being lockable to the central support shaft in the position to which they have been adjusted by expansion of the hydraulically actuable expansible members at their inner periphery. To enable the expansion of the hydraulically expansible members, each annular head includes an hydraulic actuator which is accessible and operable from a position exteriorly of the assembled cylinder assembly.

In the event that the ends of the printing cylinder have been recessed internally to provide end abutments, a single hydraulic actuator is provided for each head for simultaneously expanding the respective hydraulically actuable expansible members in tandem, thus permitting the support shaft to be passed through the cylinder, the annular heads to be slid onto the respective ends of the shaft and positioned within the recessed ends of the cylinder, the shaft then adjusted into desired position axially of the cylinder, and, the entire assembly then locked by appropriate actuation of the respective hydraulic actuators.

In the event that the cylinder is of uniform internal diameter between its ends, then, the respective heads are preferably provided with dual and independently operable hydraulic actuators separately connected to actuate the respective hydraulically actuable extensible members at the inner and outer peripheries of the respective annular heads. In this manner, the heads can be slid axially onto the shaft, and then locked to the support shaft in a desired position longitudinally thereof by appropriate actuation of the hydraulic actuators associated with the hydraulically actuable expansible members at the inner periphery of the respective heads. The support shaft and the heads assembled thereto can then be passed into the printing cylinder, and the heads then locked to the printing cylinder by appropriate actuation of the hydraulic actuators associated with the hydraulically actuable expansible members at the outer periphery of the respective heads.

As readily will be appreciated, the desired positioning of the respective heads readily can be obtained by sliding a thin metal sleeve of a length appropriate to a particular length of cylinder onto the shaft for it to lie intermediate the respective heads, and by then moving the respective heads into abuting relation with the sleeve prior to the actuation of the appropriate hydraulic actuator associated with the respective heads.

DESCRIPTION OF THE INVENTION

Preferred embodiments of the present invention will now be described with reference to the accompanying drawings, in which.

Figure 1:
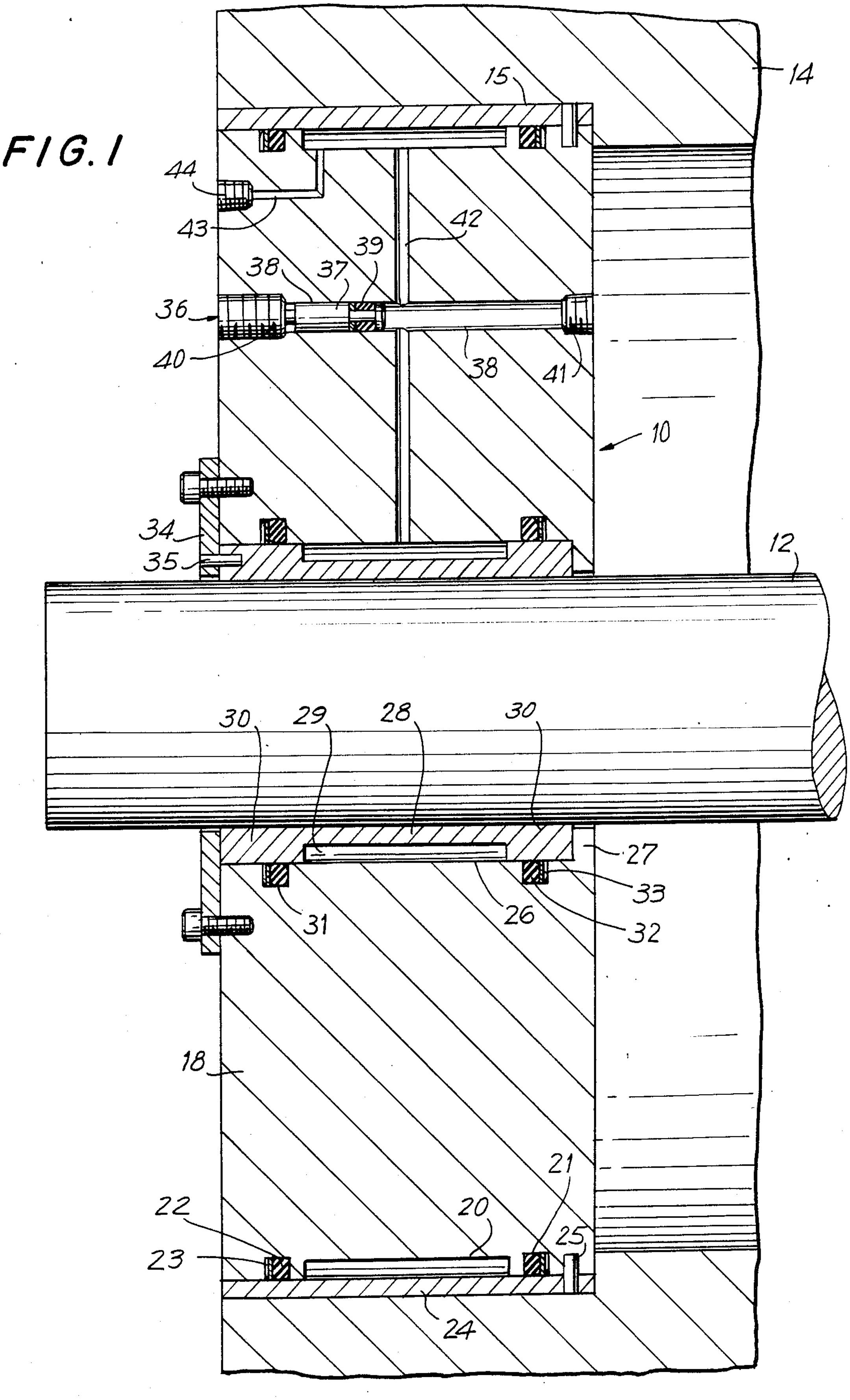
FIG. 1 is a cross-section through an annular expansible head according to the present invention, and which is shown in association with one end of a support shaft and one end of a printing cylinder.

Referring to FIG. 1 of the drawings, the annular expansible head is indicated generally at 10, the annular head being shown as supported by and clamped onto a central supporting shaft 12. At its outer periphery, the annular head 10 is shown supporting one end of a printing cylinder 14, the printing cylinder 14 being shown as one which has been recessed at its end, at 15, in order to provide an abutment for the annular head 10.

The shaft at 12 preferably is formed from an extremely rigid material, such as steel, and is precision ground for the central portion thereof to be axially straight and of uniform diameter throughout its length.

The annular head 10 includes an annular body 18, formed from any suitable rigid and dimensionally stable material such as steel or a suitable aluminum alloy.

The outer periphery of the body 18 is recessed intermediate its ends to provide a channel 20 extending peripherally of the body 18. Adjacent its ends, the body 18 provided with grooves 21 in which are received O-rings 22 and back-up rings 23. Supported on the outer periphery of the annular body 18 and sealed by the O-rings 22 is a cylindrical expansion diaphragm 24, which is located against rotational and axial movement relative to the body 18 means of pins 25 extending through apertures in the expansion diaphram 24, and which are an interference fit in bores in the annular body 18.

At its inner periphery, the annular body 18 is recessed at 26 for it to provide an end stop 27 for a cylindrical expansion diaphram 28, which is externally channeled between its ends at 29 in order to provide lands 30 at the axial ends thereof. The cylindrical expansion diaphram 28 preferably is a press fit within the recess 26 of the annular body, the lands 30 being aligned with grooves 31 in the inner periphery of the recess 26, and engaged by O-rings 32 and back-up rings 33 positioned within the grooves 31.

At one of its ends, the cylindrical expansion diaphram 28 abuts the end stop 27. The cylindrical expansion diaphram 28 is located against axial or circumferential movement within the recess 26 by end plates 34 attached to the annular body 18, and by pins 35 carried by the end plates and which are received within bores in the adjacent end of the cylindrical expansion diaphram 28.

Located within the end face of the annular body 18, and intermediate the inner and outer peripheries thereof, is a hydraulic actuator 36. The actuator includes a piston 37 received within a bore 38 in the annular body 18, and which is sealed by an O-ring 39 provided with a back-up ring. The piston 37 is movable axially by a threaded plug 40 received within an appropriately threaded bore in the annular body 18, the opposite end of the bore being closed by a plug 41. Connecting with the bore 38 is a radial passage 42. The radial passage 42 communicates with the channel 20 in the outer periphery of the annular body 18, and also with the channel 29 in the outer periphery of the cylindrical expansion diaphram 28. Upon rotation of the threaded plug 40 in an appropriate direction, hydraulic fluid, such as grease or heavy oil, is expressed from the bore 38 by the piston 37, and acts on the respective cylindrical expansion diaphrams 24 and 28 to expand them, respectively, into clamping engagement with the inner periphery of the cylinder 14 and into clamping engagement with the outer periphery of the shaft 12. In order to permit the removal of air from the hydraulic system during the charging thereof with hydraulic fluid, a bleeder passage 43 is provided, which, once the hydraulic system has been fully charged with hydraulic fluid, is closed by a plug 44.

In this embodiment of the invention, in order to exchange the cylinder 14 for a different cylinder of the same diameter, hydraulic pressure within the hydraulic system is relieved by reverse rotation of the plug 40 of the hydraulic actuator 36, this permitting the respective cylindrical expansion diaphrams to retract and free the annular head 10 from clamping engagement with the shaft at 12 and the printing cylinder 14. The annular heads are then moved axially of the shaft at 10 to free the cylinder, one of the heads is temporarily removed from the shaft, and, the cylinder is withdrawn and replaced by another cylinder of the same diameter, but, of any selected length. The respective heads are then slid axially on the shaft at 12 into seating engagement with the end abutments provided by the recesses 15 in the ends of the cylinder, subsequent to which the heads are moved axially of the shaft at 12 to their desired location, and, the entire assembly re-locked by actuation of the hydraulic actuators 36.

Should it be desired to substitute a cylinder of different diameter to the one removed, then, the respective heads would be removed from the shaft and substituted by heads of the same internal diameter, but of an appropriate external diameter.

Figure 2:
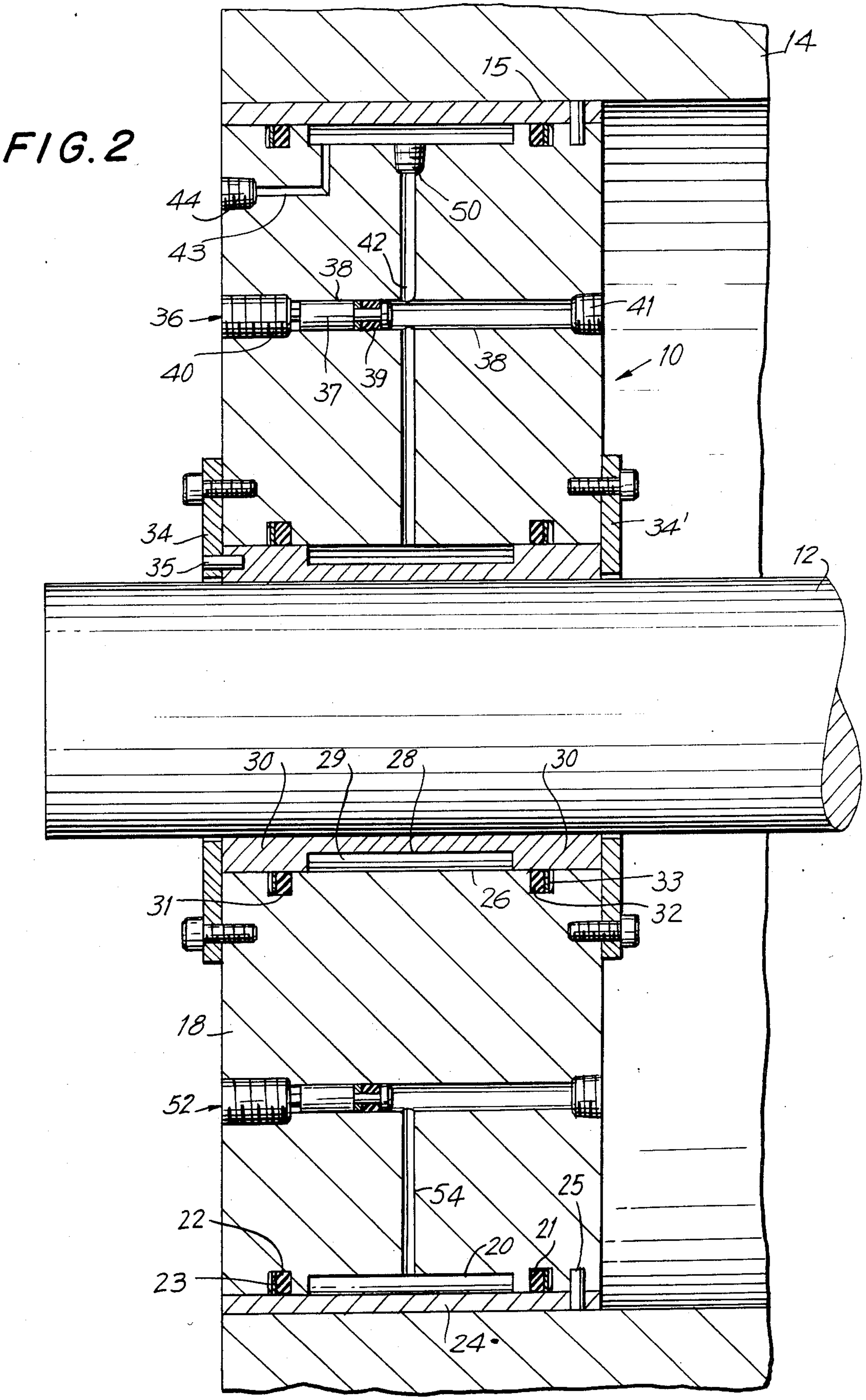
FIG. 2 is a cross-section through an alternative embodiment of the annular expansible head according to the present invention, in association with one end of a support shaft and one end of a printing cylinder, as shown in FIG. 1.

Referring now to FIG. 2, the same reference numerals have been used to identify members corresponding with those already discussed with respect to FIG. 1.

In this embodiment, the interconnection of the radial passage 42 with the radially outer recess 20 is blocked by a plug 50. The hydraulic actuator 36 is operative to actuate the radially inner cylindrical expansion diaphram 28 only, thus permitting the annular head 10 to be locked to the shaft without regard to whether or not it is at that time supporting a printing cylinder 14.

A second hydraulic actuator 52 is provided in the annular body 18, the hydraulic actuator 42 being of identical construction to the hydraulic actuator 36. The hydraulic actuator 52 communicates with the outer recess 20 through a second radial passage 54. While shown displaced from each other diametrically of the annular body 18, the respective hydraulic actuators 36 and 52 need not be so positioned, but if desired, may be positioned closely adjacent to each other and at different distances radially of the annular body 18. Optionally, and as illustrated in FIG. 2, the end stop 27 of FIG. 1 can be ommitted, and a second end plate 34′ be substituted therefor in order to provide for the axial location and positioning of the cylindrical expansion diaphram 28.

In this embodiment, should it be desired to replace the printing cylinder 14 with a different printing cylinder of the same length and diameter, then, all that is necessary is for the hydraulic actuators 52 to be operated in an appropriate direction to relieve hydraulic pressure in the recess 20 at the outer periphery of the annular body 18, at which time the printing cylinder will become released from the respective heads and can be withdrawn axially therefrom. Should it be desired to substitute a printing cylinder of different length to the one removed, then, after having removed the cylinder 14, the respective hydraulic actuators 36 would be operated to release the heads from clamping engagement with the shaft. The heads would be then be repositioned axially of the shaft at their desired position and re-locked to the shaft. In the event that a cylinder of different diameter to the one removed was to be substituted the respective heads would be removed from the shaft and substituted by similar heads of an appropriate external diameter.

As will be readily appreciated, the annular heads of the embodiment of FIG. 2 find particular application in printing presses performing multiple printing operations, and in which it is required that the respective printing cylinders be rotated in synchronism and in determined angular relationship relative to each other. Should any offsetting of the printing by the respective cylinders be apparent, then, the particular cylinder which is offset can be temporarily released from its supporting annular head, and that cylinder then be inched by rotating it relative to the heads to bring the respective printed images into alignment.

Figure 3:
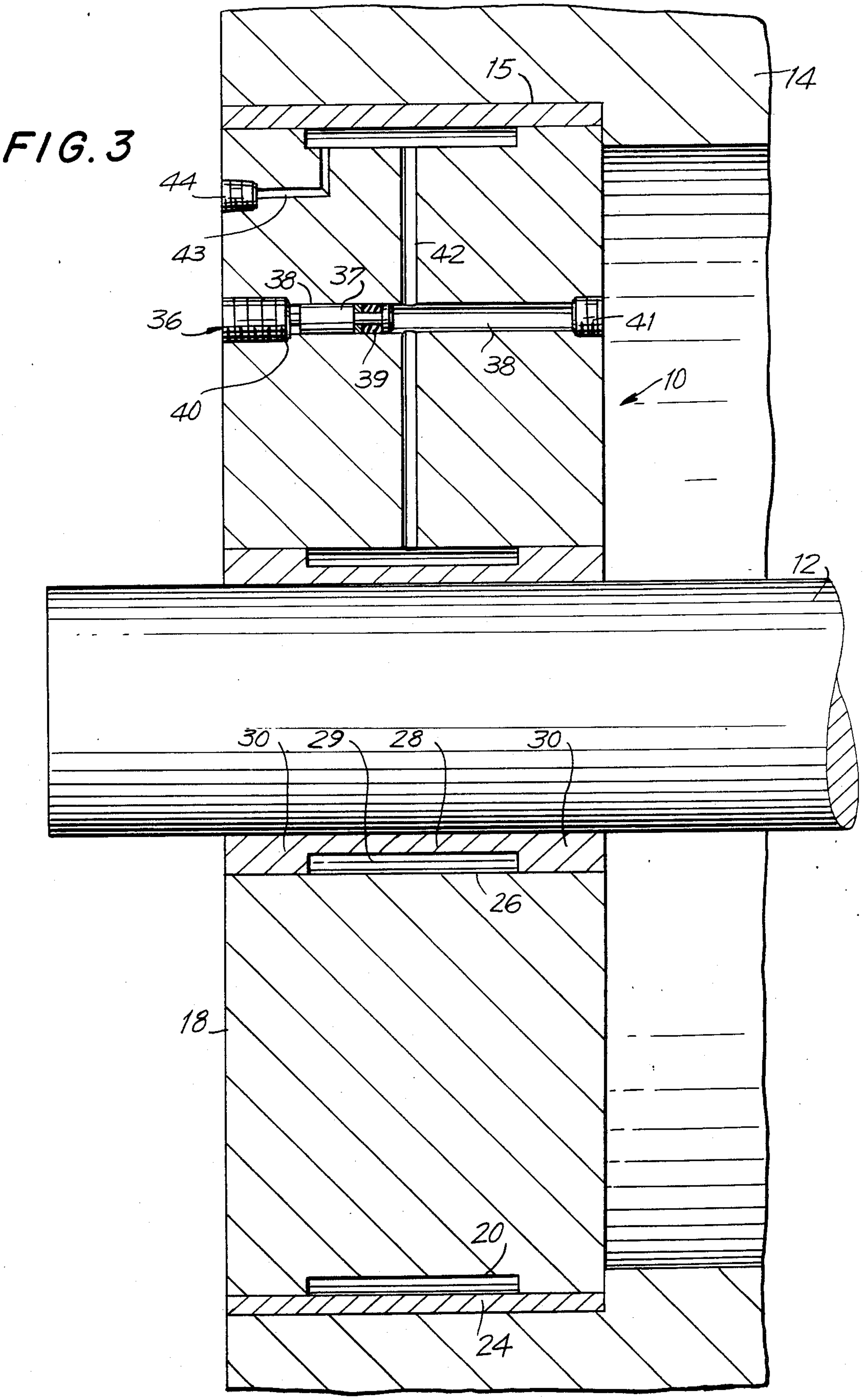
FIG. 3 is a cross-section through a printing cylinder assembly incorporating an alternative form of the expansible heads according to the present invention.

Referring now to FIG. 3, there is shown a modification of the annular head of FIG. 1, the modification being equally applicable to the annular head of FIG. 2. In FIG. 3, the same reference numbers have been employed as in FIG. 1 to identify those members common to both embodiments. In FIG. 3, the grooves 21, 31, to O-rings 22, 32 the back-up rings 23, 33 the pins 25, 35 and the end plates 34 of FIG. 1 have been eliminated in their entirety, and the cylindrical expansion diaphragms 24 and 28 are brazed directly to the annular body 18 at their respective ends, thus providing hermetic seals for the channels 20 and 29, while at the same time eliminating the possibility of relative axial or rotational movement between the body 18 and the respective expansion diaphragms.

It will be understood that the embodiments described above are preferred embodiments falling within the scope of the appended claims, and, that various modifications may be made in the actual structures disclosed without it departing from the scope of the appended claims.

What is claimed is:

1. An annular head for the support of a printing cylinder, including:
  - a rigid and dimensionally stable annular body having internal and external peripheries and an axial length;
  - a first cylindrical expansion diaphram having an axial length less than or equal to the axial length of said annular body and extending axially of said external periphery of said annular body, said first diaphram and said annular body, in combination, defining a first expansion chamber at the external periphery of said body;
  - a second cylindrical expansion diaphram having an axial length less than or equal to the axial length of said annular body and extending axially of the internal periphery of the annular body, said second diaphragm and said annular body, in combination, defining a second expansion chamber at the internal periphery of said body;
  - at least one hydraulic actuator operatively connected to said first and second cylindrical expansion chambers; and,
  - hydraulic actuator means comprising said at least one hydraulic actuator for pressurizing said respective first and second expansion chambers, and for expanding said first cylindrical expansion diaphram radially outwardly of said annular body, and, for expanding said second cylindrical expansion diaphram radially inwardly of said annular body.

2. The annular head of claim 1, including a single hydraulic actuator operatively connected to simultaneously expand both said first cylindrical expansion diaphram and said second cylindrical expansion diaphram.

3. The annular head of claim 1, including dual hydraulic actuators, a first said hydraulic actuator being operatively connected to expand said first cylindrical expansion diaphram in a direction radially outwardly of said annular body, and a second said hydraulic actuator being operatively connected to expand said second cylindrical expansion diaphram radially inwardly of said annular body, said respective dual hydraulic actuators each being operable independently of the other.

4. The annular head of claim 1, in which said at least one hydraulic actuator is operable from a position exterior to said annular head in the assembled condition of said printing cylinder assembly.

5. In combination, a support shaft, a printing cyinder, and dual annular heads supported on said shaft and supporting said printing cylinder, each said annular head including:

a rigid and dimensionally stable annular body having internal and external peripheries and an axial length;

a first cylindrical expansion diaphram having an axial length less than or equal to the axial length of said annular body and extending axially of said external periphery of said annular body, said first diaphram and said annular body, in combination, defining a first expansion chamber at the external periphery of said body;

a second cylindrical expansion diaphram having an axial length less than or equal to the axial length of said annular body and extending axially of the internal periphery of the annular body, said second diaphram and said annular body, in combination, defining a second expansion chamber at the internal periphery of said body;

at least one hydraulic actuator operatively connected to said first and second cylindrical expansion diaphrams; and hydraulic actuator means comprising said at least one hydraulic actuator for expanding said first cylindrical expansion diaphram radially outwardly of said body, and, for expanding said second cylindrical expansion diaphram radially inwardly of said annular body.

6. The combination of claim 5, in which each said annular head includes a single hydraulic actuator operatively connected to simultaneously expand both said first cylindrical expansion diaphram and said second cylindrical expansion diaphram.

7. The combination of claim 5, in which each said annular head includes dual hydraulic actuators, a first said hydraulic actuator being operatively connected to expand said first cylindrical expansion diaphram in a direction radially outwardly of said annular body, and a second said hydraulic actuator being operatively connected to expand said second cylindrical expansion diaphram radially inwardly of said annular body, said respective dual hydraulic actuators each being operable independently of the other.

8. The combination of claim 5, in which said at least one hydraulic actuator of each annular head is operable from a position exterior to said annular head in the assembled condition of said printing cylinder assembly.

* * * * *